(12) United States Patent
Seo et al.

(10) Patent No.: US 8,363,217 B2
(45) Date of Patent: Jan. 29, 2013

(54) SPECTROMETRIC MEASUREMENT APPARATUS, IMAGE EVALUATION APPARATUS, AND IMAGE FORMING APPARATUS

(75) Inventors: Manabu Seo, Kanagawa (JP); Naohiro Kamijo, Kanagawa (JP); Kohei Shimbo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 12/901,280

(22) Filed: Oct. 8, 2010

(65) Prior Publication Data

US 2011/0106472 A1 May 5, 2011

(30) Foreign Application Priority Data

Nov. 4, 2009 (JP) ................................. 2009-253498

(51) Int. Cl.
*G01J 3/28* (2006.01)
(52) U.S. Cl. ...................................................... 356/328
(58) Field of Classification Search .................. 356/328, 356/326, 334; 250/226; 702/76
See application file for complete search history.

(56) References Cited

U.S. PATENT DOCUMENTS

| | | | |
|---|---|---|---|
| 5,847,877 A | 12/1998 | Imamura et al. | |
| 5,933,520 A | 8/1999 | Ishimoto et al. | |
| 6,975,949 B2 | 12/2005 | Mestha et al. | |
| 7,433,041 B2 | 10/2008 | Frick | |
| 8,174,694 B2 * | 5/2012 | Bodkin | ........................ 356/328 |

FOREIGN PATENT DOCUMENTS

| | | |
|---|---|---|
| JP | 11-313334 | 11/1999 |
| JP | 2002-310799 A | 10/2002 |
| JP | 2003-139702 A | 5/2003 |
| JP | 3568334 B2 | 6/2004 |
| JP | 3717555 B2 | 9/2005 |
| JP | 2005-315883 A | 11/2005 |
| JP | 2008-518218 A | 5/2008 |
| JP | 2010-190672 A | 9/2010 |
| WO | WO 02/50783 A1 | 6/2002 |
| WO | WO 03/038383 A1 | 5/2003 |

* cited by examiner

*Primary Examiner* — Tarifur Chowdhury
*Assistant Examiner* — Abdullahi Nur
(74) *Attorney, Agent, or Firm* — Dickstein Shapiro LLP

(57) ABSTRACT

A spectrometric measurement apparatus includes a light radiation unit for radiating light onto a medium; a hole array including openings arranged one-dimensionally for transmitting diffusion light from the medium; an imaging optical system configured to focus an image from the hole array; a diffraction element configured to diffract the light for focusing the image; and a light receiving unit including pixels arranged one-dimensionally configured to receive the light that has been dispersed by the diffraction element and spectrometric sensors each corresponding to a predetermined number of the pixels. The light transmitted through each of the openings of the hole array is dispersed by the diffraction element, and then the light enters the pixels so that spectral properties of the diffusion light are acquired. The structure of the diffraction element includes variations that are formed in accordance with the height of the image that is focused by the imaging optical system.

9 Claims, 17 Drawing Sheets

FIG.5
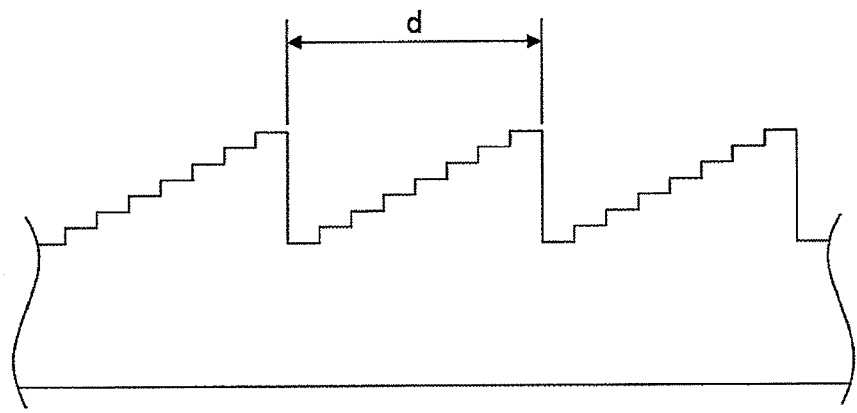
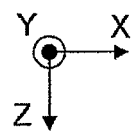
FIG.6
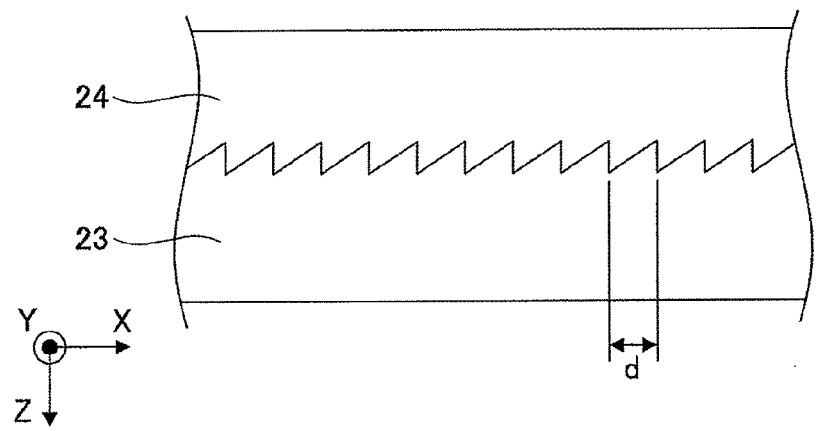

FIG.7
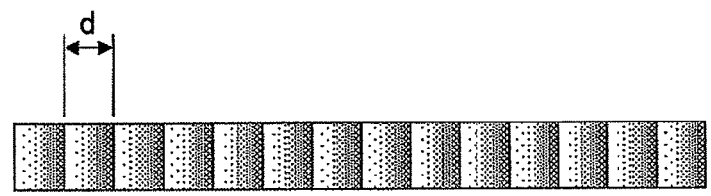
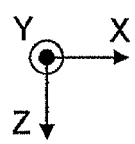
FIG.8
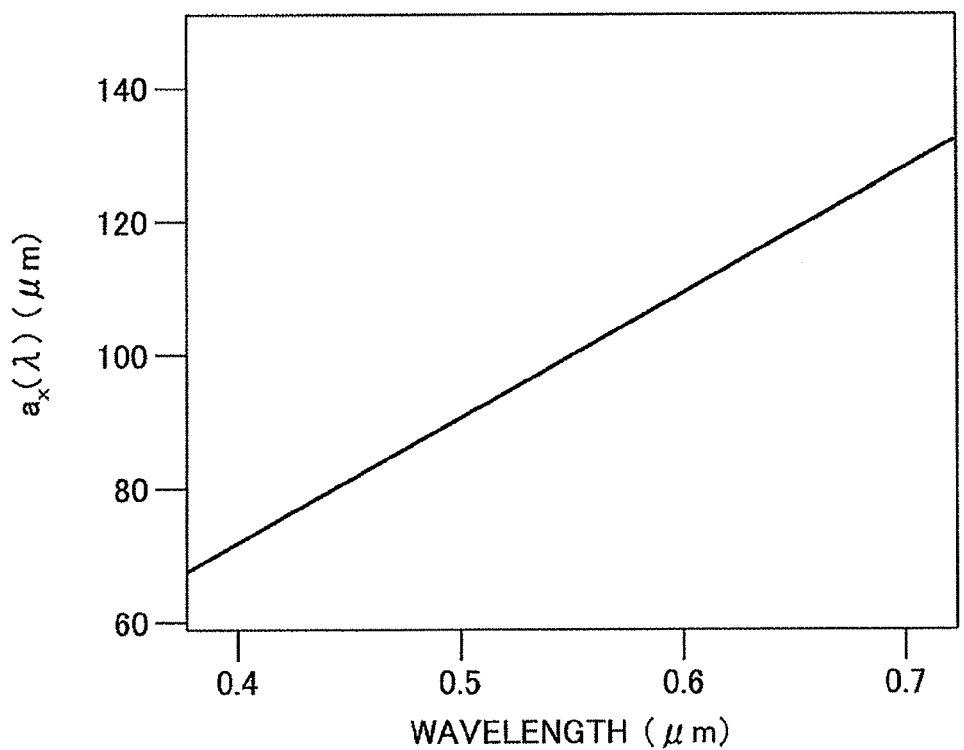

SPECTROMETRIC MEASUREMENT APPARATUS, IMAGE EVALUATION APPARATUS, AND IMAGE FORMING APPARATUS

BACKGROUND OF THE INVENTION

1. Field of the Invention

The present invention relates to spectrometric measurement apparatuses, image evaluation apparatuses, and image forming apparatuses.

2. Description of the Related Art

In recent years, in the field of production printing, sheet-feed printing press machines and printers for continuous slip/form paper have been digitalized. Accordingly, numerous products using the electrophotographic method and the inkjet method have been introduced. Furthermore, user needs have increased for multidimensional, high-precision, and high-density images, with the trend switching from monochrome printing to color printing. Accordingly, services delivered to consumers have become versatile. For example, there have been various advertisements catering to personal needs such as high quality photograph printing, catalog printing, and account printing. Thus, there is increased demand for high quality images, confirmation of personal information, and color reproduction.

Various techniques have been introduced in the market for increasing the image quality of image forming apparatuses. One example is providing an electrophotographic type image forming apparatus with a density sensor for detecting the toner density of unfixed toner on an intermediate transfer body or a photoconductive body, to stabilize the amount of toner supply. Another example is for confirming personal information. Specifically, regardless of the image forming method, the output image is photographed with a camera, and the personal information is detected by variance detection based on character recognition or a difference image between plural images. Yet another example is for color reproduction. Specifically, a color patch is output, and colors are measured at one or more points with a spectrometer to execute calibration.

The above techniques are preferably performed across the entire image area, in order to accommodate image variations between different pages or within the same page.

Patent documents 1 through 5 propose evaluation methods executed in the process of measuring properties across the full width of the image.

Patent document 1 discloses a technique of arranging plural line-type light receiving elements, and providing a mechanism for moving a measurement target relative to a detection system, to measure the spectral properties across the full width of the image. A light shielding wall is provided so that reflection light crosstalk does not occur at the detection target area between the light receiving elements.

Patent document 2 discloses a technique of continuously radiating the full width of the image with light sources having different wavelength bands, and acquiring the reflection light to acquire spectral properties across the full width of the image.

Patent document 3 discloses a technique of radiating light onto the full width of a print side, detecting the density in a particular region with a line sensor camera, and averaging the density, to compare the reference densities.

Patent document 4 discloses a technique of scanning an original document and a special original document several times, and determining the similarity between the two documents by obtaining the logical sum between the images with regard to common color information.

Patent document 5 discloses a technique of radiating light onto the full width of a print side, and acquiring spectral properties across the full width of the image with the use of a combination of a CCD (Charge Coupled Device) having a two-dimensional pixel structure and a diffraction element or a refraction element.

As described above, typical configurations for measuring colors of an image across the full width of the image include the following examples. One example is irradiating the image with plural light beams having different wavelength bands and moving the measuring system and the detection target with respect to each other while photographing the image with an area sensor or a line sensor. Another example is providing plural photographing systems, and limiting the wavelength band of the reflection light from the detection target that enters the photographing system. If a positional shift occurs in the detection target while acquiring plural wavelength bands of images, the color information at the respective detection target points cannot be precisely measured. Examples of methods of precisely measuring color information in plural images having different wavelength bands are as follows. One example is comparing the intensity of the reflection light acquired at the detection target position in an image with that of an original image or original data serving as a reference. Another example is applying the Wiener estimation technique based on the intensity of reflection light acquired from the detection target positions in the images, to estimate continuous distribution properties. Thus, if the detection target positions are different in the images, errors may arise in the process of making comparisons with a reference or in the process of estimating continuous distribution properties.

Patent document 1 discloses a line-type measuring system for measuring the colors across the full width of the image that is the detection target. However, this technique does not reduce positional shifts in the images obtained at the respective wavelength bands.

Patent document 2 discloses a technique of continuously irradiating the image with light sources having different wavelength bands, and acquiring the reflection light from the detection target. However, with this configuration, a shift may occur in the time axis, and therefore it is not possible to measure the same position in the detection target. Even if plural combinations of light sources and light receiving systems are provided, the detection target positions are highly likely to shift in images of different wavelength bands. Furthermore, patent document 2 discloses a configuration of using plural rows of detectors that are filtered by different colors. In this case also, positional shifts in the images may occur among the plural colors.

Patent document 3 discloses a technique of averaging the density in the detection region, and the average value is assumed to be the representative value. However, the value obtained as the distribution of the detection target is unreliable.

Patent document 4 discloses a technique of determining the similarity between two documents by comparing an original document with a detection target by inter-image calculation for each wavelength band. However, with this method, the color variation of the detection target cannot be specified. Furthermore, in a case where an image is reconstituted based on color information items of images that are separately obtained, it cannot be determined as to whether the color variations have occurred in the actual detection target.

Patent document 5 discloses a technique of using a CCD having a two-dimensional pixel structure. The image data is acquired in one direction, and spectroscopic data is acquired in the other direction, in order to specify the color information across the full width of the image. However, in a CCD having a two-dimensional pixel structure, the reading speed is considerably slower than that of the line sensor due to limitations in the data reading properties. Accordingly, it takes a long time to acquire color information of the detection target.

As described above, in the conventional technology, with a spectroscopic sensor for measuring spectroscopic information across the full width of the target image, it has been difficult to read data at high speed while acquiring high-precision spectroscopic data.

Patent Document 1: Japanese National Publication (Japanese translation of PCT application) No. 2008-518218
Patent Document 2: Japanese Laid-Open Patent Application No. 2005-315883
Patent Document 3: Japanese Laid-Open Patent Application No. 2002-310799
Patent Document 4: Japanese Patent No. 3566334
Patent Document 5: Japanese Laid-Open Patent Application No. 2003-139702

SUMMARY OF THE INVENTION

The present invention provides a spectrometric measurement apparatus, an image evaluation apparatus, and an image forming apparatus in which one or more of the above-described disadvantages are eliminated.

A preferred embodiment of the present invention provides a spectrometric measurement apparatus, an image evaluation apparatus, and an image forming apparatus, in which data can be read at high speed and observation positions in plural wavelength bands do not need to be aligned, when measuring spectral properties of a reading target.

According to an aspect of the present invention, there is provided a spectrometric measurement apparatus including a light radiation unit configured to radiate light onto an image carrying medium; a hole array including plural openings that are arranged in a one-dimensional manner for transmitting a part of the light corresponding to diffusion light from the image carrying medium; an imaging optical system configured to focus an image from the hole array; a diffraction element configured to diffract the light for focusing the image; and a light receiving unit including plural pixels arranged in a one-dimensional manner configured to receive the light that has been dispersed by the diffraction element, the light receiving unit further including plural spectrometric sensors each corresponding to a predetermined number of the plural pixels, wherein the light transmitted through each of the plural openings of the hole array is dispersed by the diffraction element, and then the light enters the plural pixels corresponding to one of the plural spectrometric sensors of the light receiving unit so that spectral properties of the diffusion light are acquired, and a structure of the diffraction element includes variations that are formed in accordance with an image height of the image that is focused by the imaging optical system.

According to an aspect of the present invention, there is provided an image evaluation apparatus for evaluating colors of a color image including plural colors formed on an image carrying medium, the image evaluation apparatus including a spectrometric measurement apparatus including a light radiation unit configured to radiate light onto the image carrying medium, a hole array including plural openings that are arranged in a one-dimensional manner for transmitting a part of the light corresponding to diffusion light from the image carrying medium, an imaging optical system configured to focus an image from the hole array, a diffraction element configured to diffract the light for focusing the image, and a light receiving unit including plural pixels arranged in a one-dimensional manner configured to receive the light that has been dispersed by the diffraction element, the light receiving unit further including plural spectrometric sensors each corresponding to a predetermined number of the plural pixels, wherein the light transmitted through each of the plural openings of the hole array is dispersed by the diffraction element, and then the light enters the plural pixels corresponding to one of the plural spectrometric sensors of the light receiving unit so that spectral properties of the diffusion light are acquired, and a structure of the diffraction element includes variations that are formed in accordance with an image height of the image that is focused by the imaging optical system; and a processing unit configured to evaluate the color image based on the spectral properties acquired by the spectrometric measurement apparatus.

According to one embodiment of the present invention, a spectrometric measurement apparatus, an image evaluation apparatus, and an image forming apparatus are provided, in which data can be read at high speed and observation positions in plural wavelength bands do not need to be aligned, when measuring spectral properties of a reading target.

BRIEF DESCRIPTION OF THE DRAWINGS

Other objects, features and advantages of the present invention will become more apparent from the following detailed description when read in conjunction with the accompanying drawings, in which:

FIG. 5 illustrates another example of a diffraction element used in the first embodiment of the present invention;

FIG. 6 illustrates yet another example of the diffraction element used in the first embodiment of the present invention;

FIG. 7 illustrates yet another example of the diffraction element used in the first embodiment of the present invention;

FIG. 8 is a correlation chart of a wavelength $\lambda$, a period, and a position $a_x(\lambda)$ of light entering the diffraction element;

DETAILED DESCRIPTION OF THE PREFERRED EMBODIMENTS

A description is given, with reference to the accompanying drawings, of embodiments of the present invention.

First Embodiment

Figure 1:
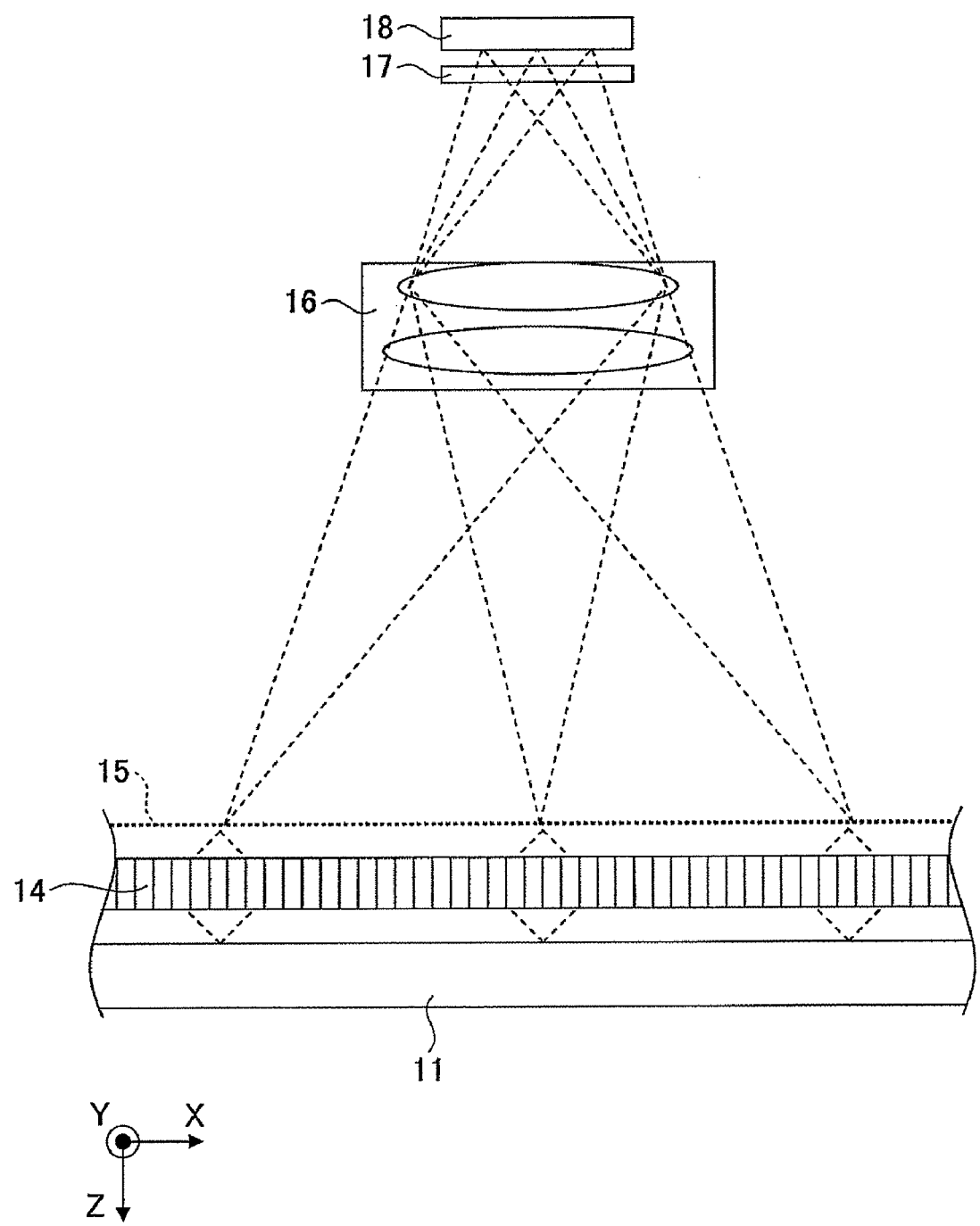
FIG. 1 is a top view of a spectrometric measurement apparatus according to a first embodiment of the present invention.
Figure 2:
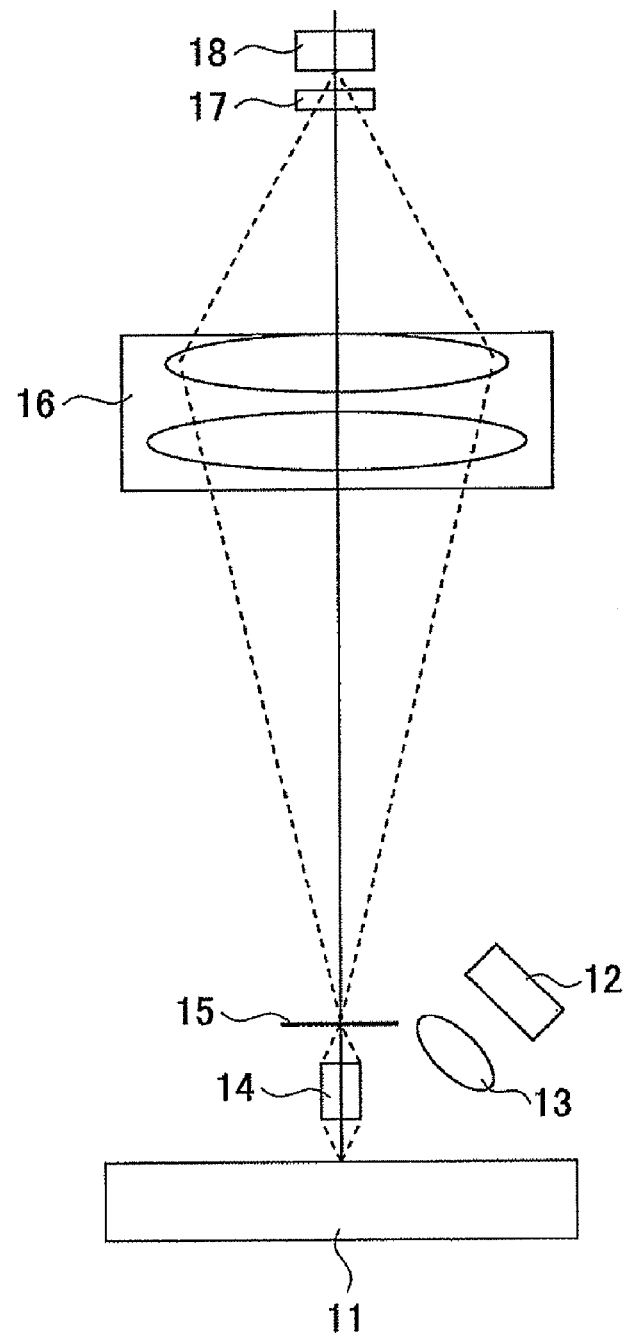
FIG. 2 is a side view of the spectrometric measurement apparatus according to the first embodiment of the present invention.

A spectrometric measurement apparatus according to a first embodiment of the present invention is described with reference to FIGS. 1 and 2. FIG. 1 is a top view of the spectrometric measurement apparatus according to the present embodiment, and FIG. 2 is a side view of the spectrometric measurement apparatus according to the present embodiment. In the following description of the spectrometric measurement apparatus according to the present embodiment, reference is made to an X direction, a Y direction, and a Z direction. These respectively correspond to an X axis direction, a Y axis direction, and a Z axis direction indicated in FIGS. 1 and 2.

The spectrometric measurement apparatus according to the present embodiment includes a line radiation light source 12, a lens 13, a SELFOC lens 14, a hole array 15, an imaging optical system 16, a diffraction element 17, and a line sensor 18. The dashed lines indicate optical paths of diffuse reflection light from an image carrying medium 11.

The line radiation light source 12 may be a white LED (Light Emitting Diode) array having predetermined intensity across substantially the entire band of the visible light. The line radiation light source 12 may also be a fluorescent lamp such as a cold-cathode tube and a lamp light source. The line radiation light source 12 preferably emits light having a wide wavelength band necessary for spectroscopy, and uniformly radiates the light onto the image carrying medium 11.

The lens 13 collimates the light beams (as parallel light beams) radiated from the line radiation light source 12 and directs the collimated light beams onto the image carrying medium 11 made of paper, etc. Alternatively, the lens 13 collects the light beams radiated by the line radiation light source 12 and directs them onto the image carrying medium 11. Accordingly, the light beams emitted from the line radiation light source 12 are radiated onto the image carrying medium 11 made of paper, in the form of a line extending in the depth direction of the image carrying medium 11. The present embodiment includes the line radiation light source 12 and the lens 13; however, the lens 13 may be excluded in other examples.

The SELFOC lens 14 has a function of focusing the image formed on the image carrying medium 11 onto the hole array 15 (described below). However, the image does not necessarily need to be precisely focused on the hole array 15. The image may be defocused on the hole array 15. The present embodiment includes the SELFOC lens 14; however, instead of the SELFOC lens 14, the spectrometric measurement apparatus may include a full-scale imaging optical element such as a micro-lens array or imaging lenses including plural lenses.

The hole array 15 includes plural openings that are arranged in a row. The light transmitted through the hole array 15, as an image on the hole array 15, is dispersed at the imaging optical system 16 and the diffraction element 17, and is then focused on pixels of the line sensor 18 used for image detection.

The imaging optical system 16 may include lenses that are typically used for scanner optical systems, or lenses for line sensors that are typically used industrially. An example of lenses for line sensors is ML-L02035 (manufactured by Moritex Corporation). This lens for a line sensor is capable of focusing an image of approximately 300 mm in the X axis direction onto the line sensor 18 as an image of approximately 60 mm in the X axis direction at a magnification ratio of 0.2. In the present specification, the image height of the image focused by the imaging optical system 16 means the following. That is, in an image focused on the line sensor 18 by the imaging optical system 16, a distance in the X axis direction with respect to an origin corresponding to the center of the light axis of the imaging optical system 16 is referred to as the image height. Specifically, a distance along a direction in which pixels 21 are arranged in the line sensor 18 is referred to as the image height.

The line sensor 18 includes plural pixels that are arranged in a line. The line sensor 18 has a function of a light receiving element for acquiring the amount of diffuse reflection light of a predetermined wavelength band that enters the line sensor 18 via the diffraction element 17. The line sensor 18 may be, for example, a MOS (Metal Oxide Semiconductor Device), a CMOS (Complimentary Metal Oxide Semiconductor Device), a CCD (Charge Coupled Device), a CIS (Contact Image Sensor), and a PDA (Photo Diode Array). In the present embodiment, the line sensor 18 is a CCD line sensor including 8192 pixels that are formed at a pixel pitch p of 7 μm.

Figure 3:
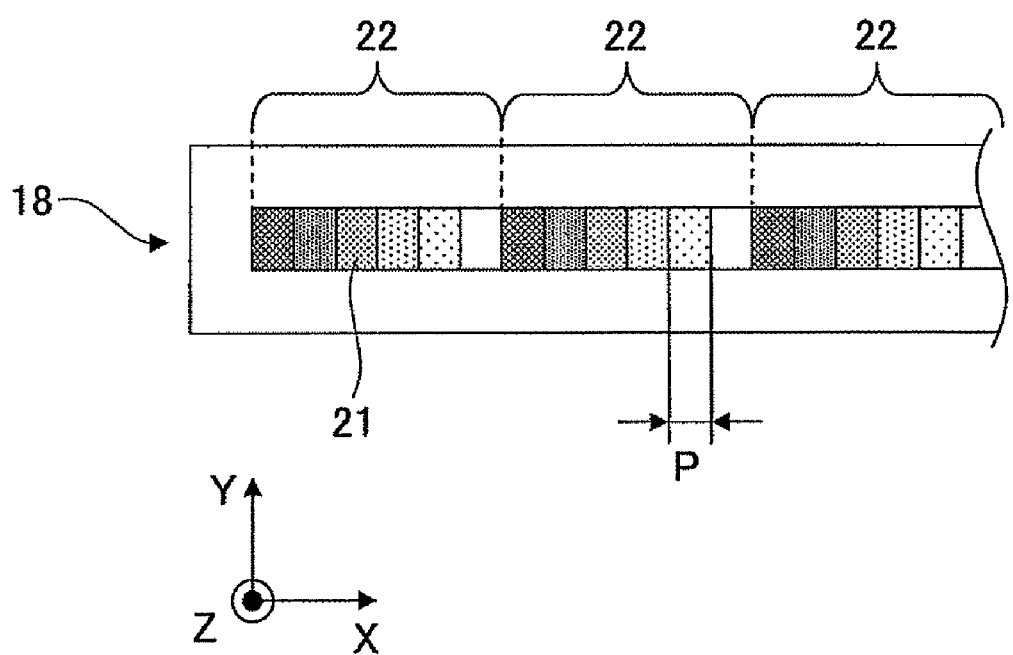
FIG. 3 schematically illustrates a line sensor used in the first embodiment of the present invention.

Next, a description is given of the line sensor 18. FIG. 3 schematically illustrates the pixel structure of the line sensor 18. As shown in FIG. 3, the line sensor 18 includes plural pixels 21 that are arranged in a row in the X direction. The line sensor 18 includes plural spectrometric sensors 22 arranged in the X direction, each including N (an integer) of the pixels 21. The pixels 21 (N pixels) in each of the spectrometric sensors 22 are configured to receive light beams having different spectral properties. In the example of the line sensor 18 in FIG. 3, the number of pixels 21 is N=6.

Figure 4:
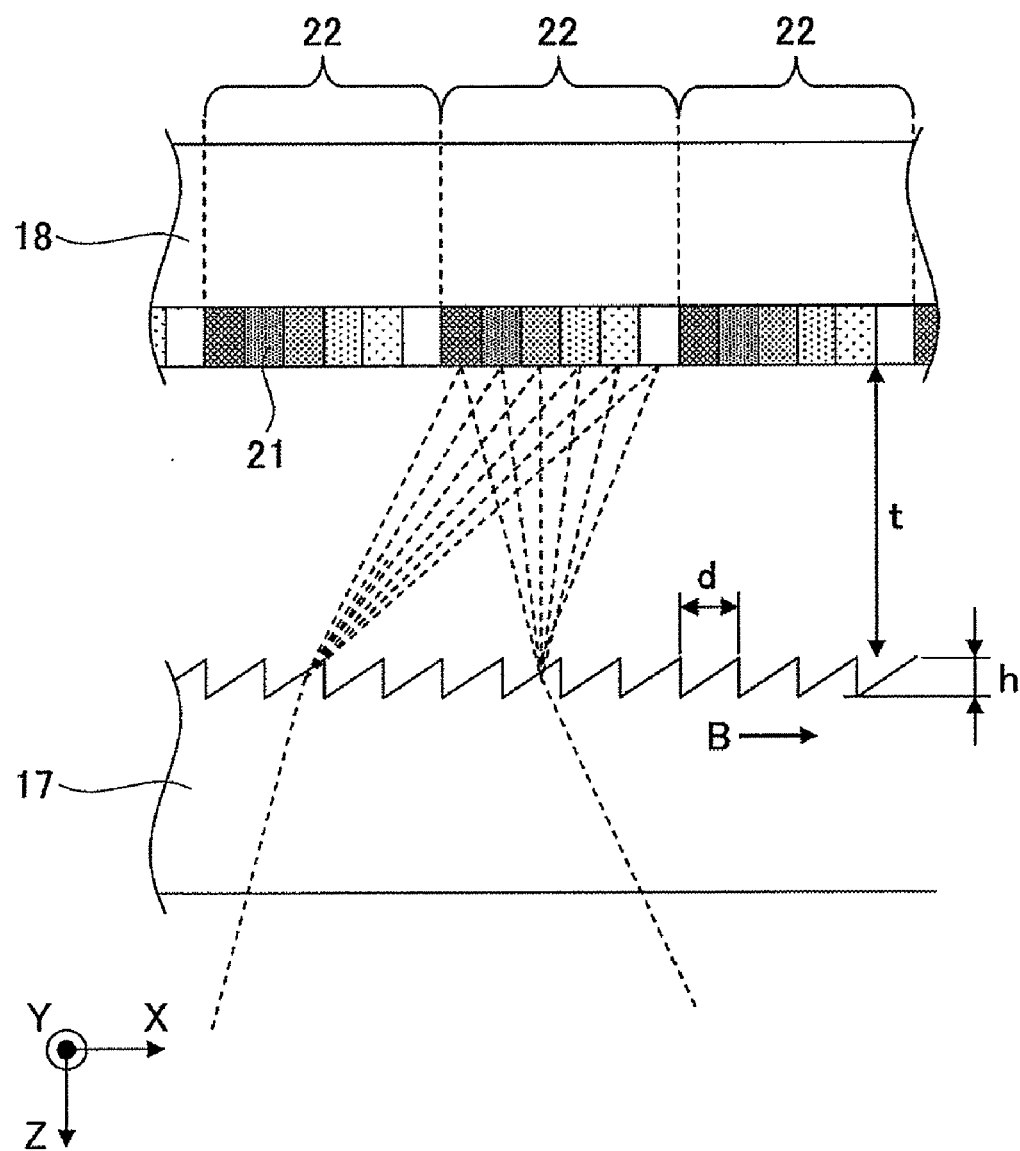
FIG. 4 is an enlarged view of relevant parts of the spectrometric measurement apparatus according to the first embodiment of the present invention.

Specifically, as shown in FIG. 4, the diffraction element 17 is positioned near the line sensor 18 and spaced away from the line sensor 18 by a length t. As indicated by the light paths illustrated with dashed lines, the incident light is diffracted toward the X direction in the line sensor 18. Therefore, light beams having different spectral properties enter the N pixels 21 in the spectrometric sensors 22. As shown in FIG. 4, the diffraction element 17 according to the present embodiment includes projections having a sawtooth cross-sectional shape that are periodically formed on a transparent substrate. In the diffraction element 17 according to the present embodiment, the direction in which the sawtooth diffraction grating is arranged (i.e., the direction of the diffraction grating vector indicated by an arrow B) is the same as the X direction. Furthermore, the sawtooth projections in the diffraction grating of the diffraction element 17 are formed at a period d. Accordingly, as indicated in formula 1, when a light beam having a wavelength λ enters the diffraction element 17 at an angle $\theta_{in}$, the light beam is diffracted in an angle $\theta_m$. In formula 1, m is an integer corresponding to a diffraction order of the diffraction element 17. The sawtooth projections of the diffraction element 17 have a height h.

$$\sin\theta_m = m\frac{\lambda}{d} + \sin\theta_{in} \qquad \text{(Formula 1)}$$

According to formula 1, the angle $\theta_m$ changes depending on the wavelength λ. Therefore, a light beam of a predetermined wavelength band can enter a predetermined pixel 21 among the N pixels 21 of the spectrometric sensors 22.

Furthermore, the diffraction element 17 shown in FIG. 4 has a sawtooth shape, and is therefore advantageous in that the intensity of the +first-order diffraction light (i.e., the light at m=1 in formula 1) can be increased. Accordingly, in the diffraction element 17 according to the present embodiment, the +first-order diffraction light is the primary light.

The diffraction element 17 may have shapes other than the above-described sawtooth shape. For example, as shown in FIG. 5, step-like shapes may be formed on the surface of the diffraction element. In another example of the diffraction element, as shown in FIG. 6, two types of materials having different refraction indices may be adhered together, and the interface where the two materials contact each other may have sawtooth shapes. Specifically, the diffraction element shown in FIG. 6 includes a first diffraction element member 23 that is made of a low-refraction-index and high-dispersion material, and a second diffraction element member 24 that is made of a high-refraction-index and low-dispersion material. The interface between the first diffraction element member 23 and the second diffraction element member 24 has sawtooth cross-sectional shapes that are formed at a period d. Accordingly, high diffraction efficiency can be achieved in an even wider wavelength band.

Furthermore, as shown in FIG. 7, the diffraction element may be formed such that the distribution of the refraction index varies periodically. In the diffraction element shown in FIG. 7, the refraction indices are indicated by shading. The dark parts correspond to high refraction indices, and the light parts correspond to low refraction indices. Even when the refraction index varies periodically at a period d as in the example of FIG. 7, the same effects as those of the above examples can be achieved.

In the above description of the diffraction element, the meaning of periodically is not limited to a strict periodic structure. In one example, the period and direction may vary moderately, but it may be locally regarded as having a periodic structure. In another example, there may be predetermined variations in the period.

As shown in FIG. 3, among the light beams entering the line sensor 18, the X direction position $a_x(\lambda)$ of a primary light beam of a wavelength λ is expressed by the following formula 2. The X direction position $a_x(\lambda)$ in formula 2 is based on an origin of zero order light (light that is not diffracted). The length between the diffraction element 17 and the line sensor 18 is t.

$$a_x(\lambda) = t(\tan\theta_m - \tan\theta_{in}) \qquad \text{(Formula 2)}$$

FIG. 8 illustrates the relationship between the position $a_x(\lambda)$ obtained by formula 2 and the wavelength, in a case where the pixel pitch p of the line sensor 18 is 7 μm, the period d of the diffraction element 17 is approximately 3.333 μm (300 lines in 1 mm), and the length t between the surface of the diffraction element 17 on which the diffraction grating is formed and the line sensor 18 is 0.6 mm. The value of the $a_x(\lambda)$ corresponds to the case where the primary light beam enters the diffraction element 17 in a perpendicular manner (i.e., when $\theta_{in}$ is 0°). As shown in FIG. 8, the value of $a_x(\lambda)$ varies according to the wavelength of light, and light is diffracted at different positions on the line sensor 18. For example, it is assumed that $\Delta a_x$ is a positional difference in the X direction between the value of $a_x(\lambda)$ at a wavelength of 0.7 μm and the value of $a_x(\lambda)$ at a wavelength of 0.4 μm. In this case, based on FIG. 8, the value of $a_x(\lambda)$ at the wavelength of 0.7 μm is approximately 130 and the value of $a_x(\lambda)$ at the wavelength of 0.4 μm is approximately 66, and therefore the positional difference in the X direction $\Delta a_x$ is approximately 56 μm. It is assumed that white light has a wavelength within a range of approximately 0.4 μm through approximately 0.7 μm, and the line sensor 18 has a pixel pitch p of 7 μm. Thus, the light radiated through one of the openings of the hole array 15 is dispersed into light beams of respective wavelengths and directed into eight pixels substantially aligned in the X direction.

As described above, in the spectrometric measurement apparatus according to the first embodiment of the present invention, the light is dispersed into light beams of respective wavelengths, and then the light beams of the predetermined wavelength bands are directed into predetermined pixels 21 that are arranged in a one-dimensional direction in the line sensor 18, so that spectral properties can be acquired. Accordingly, it is possible to acquire the required spectral properties without using an image sensor of a low reading speed having pixels that are arranged two-dimensionally. Thus, data can be read at high speed.

In a case where light beams in plural wavelength bands are photographed by different photographing systems and the photographs are later combined, the positions to be photographed need to be precisely aligned. Furthermore, positional shifts may occur in the photographed positions when combining the photographs. Therefore, in this case, a complex configuration is required. However, the spectrometric measurement apparatus according to an embodiment of the present invention is constituted by a one-dimensional line sensor. Therefore, there is no need to align the positions to be photographed, and consequently there is no concern over positional shifts in the photographed positions or combining the photographs. Accordingly, high-precision spectral properties can be easily acquired within a short period of time.

Figure 9:
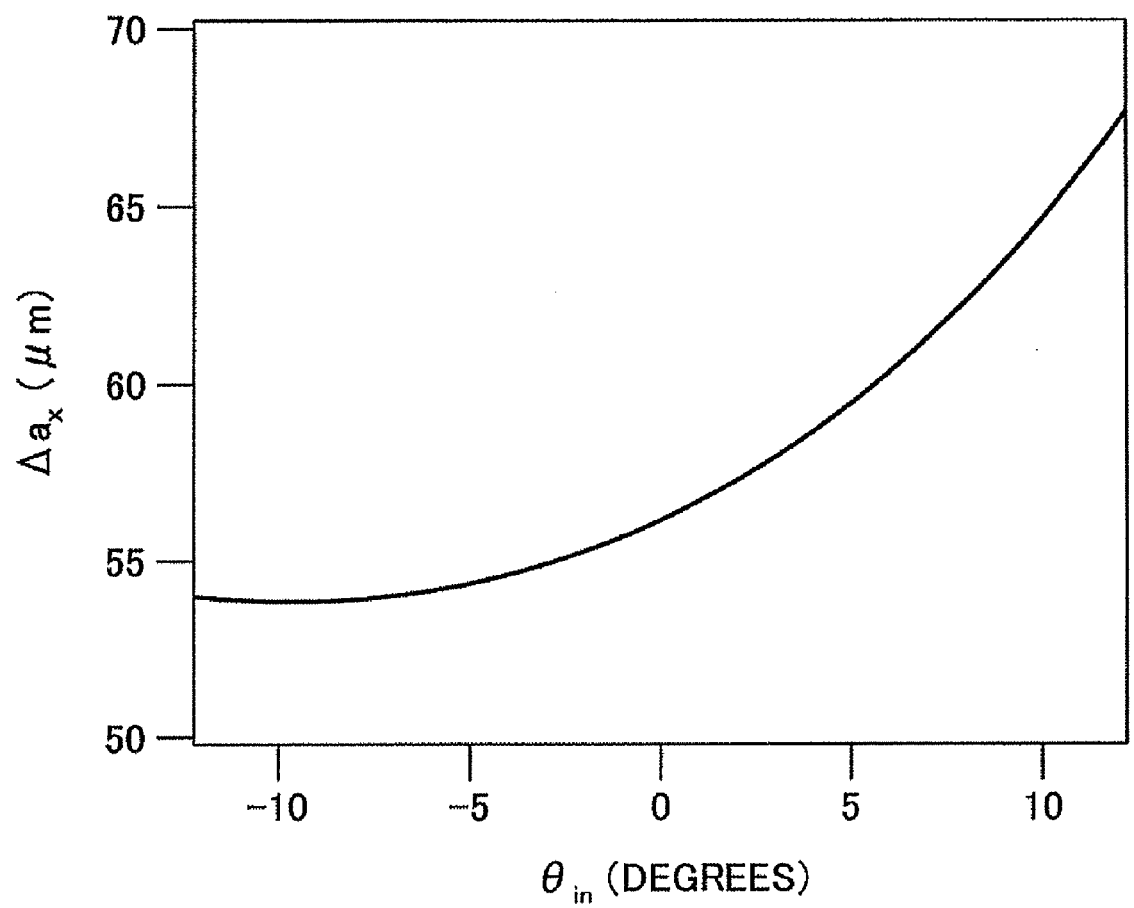
FIG. 9 is a correlation chart of an incidence angle $\theta_{in}$ of a light beam entering a typical diffraction grating and a positional difference $\Delta a_x$.

Typically, the angle $\theta_{in}$ of the primary light beam entering the diffraction element 17 varies according to the image height of the image focused by the imaging optical system 16. For example, when a lens for a line sensor is used as the imaging optical system 16, the value of $\theta_{in}$ varies within a range of ±10° with respect to an image height of ±30 mm. FIG. 9 illustrates the relationship between the incidence angle $\theta_{in}$ of the light and the positional difference $\Delta a_x$ in the X direction, in a case where the period d of the diffraction element 17 is constant at approximately 3.333 μm. When the angle $\theta_{in}$ is 0°, the positional difference $\Delta a_x$ is approximately 56 μm, and the light can be directed in the range of eight pixels if a white light is used. However, when the angle $\theta_{in}$ is 10°, the positional difference $\Delta a_x$ is approximately 63 μm, and the light is directed in a range of nine pixels if a white light is used. This means that the distribution of the dispersed light varies according to the image height focused by the imaging optical system 16. Consequently, the spectral properties acquired by the line sensor 18 may vary depending on the image height.

In order to solve this problem, one approach is to use a lens having telecentric properties on the image side in the imaging optical system 16. Accordingly, the angle $\theta_{in}$ can be made substantially constant at respective image heights, so that variations in the spectral properties acquired by the line sensor 18 can be prevented.

However, if a lens having telecentric properties is used in the imaging optical system 16, the size of the imaging optical system 16 would obviously increase, which would increase the size and the price of the spectrometric measurement apparatus.

Figure 10:
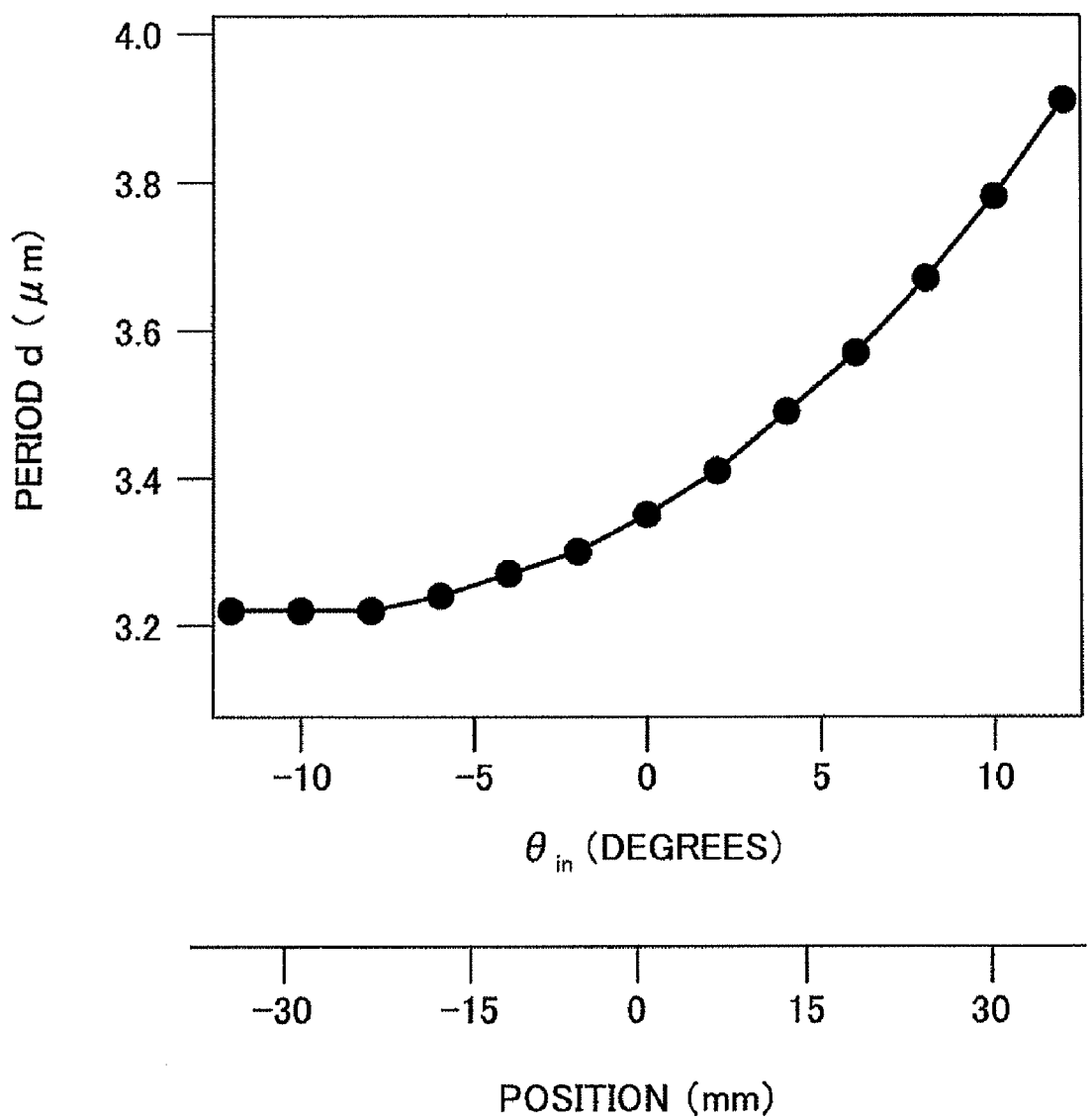
FIG. 10 illustrates a period d in the diffraction element used in the first embodiment of the present invention.

For this reason, in the spectrometric measurement apparatus according to the present embodiment, various periods d are applied to the diffraction element 17 in accordance with the image height focused by the imaging optical system 16. Specifically, as indicated in FIG. 10, the diffraction element 17 is formed such that the period d varies in accordance with the angle $\theta_{in}$ at which primary light beam enters the diffraction element 17 from the imaging optical system 16. In FIG. 10, positions in the diffraction element 17 are indicated along a bottom row below the horizontal axis. Specifically, when a lens for a line sensor is used as described above, the angle $\theta_{in}$ of ±10° corresponds to an image height of ±30 mm.

Figure 11:
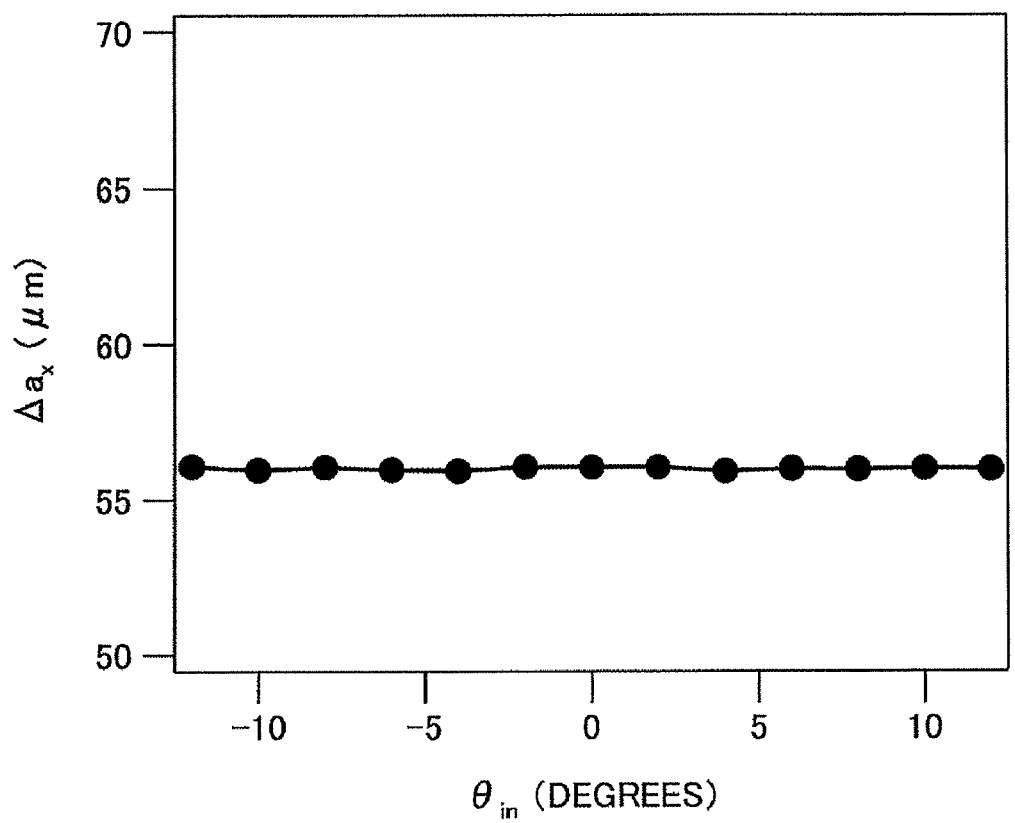
FIG. 11 is a correlation chart of an incidence angle $\theta_{in}$ of a light beam entering the diffraction grating shown in FIG. 10 and a positional difference $\Delta a_x$.

FIG. 11 illustrates the relationship between the angle $\theta_{in}$ at which the light enters and the positional difference $\Delta a_x$ in the X direction. As shown in FIG. 11, in the diffraction element 17 in which various periods d are applied in accordance with the image height focused by the imaging optical system 16, the positional difference $\Delta a_x$ in the X direction can be made substantially constant, regardless of the incidence angle $\theta_{in}$ of the light.

The periods d of the diffraction element 17 are not limited to continuously vary as illustrated in FIG. 10; the period d may vary in a stepwise manner. Furthermore, the periods d of the diffraction grating of the diffraction element 17 do not need to be specified such that the positional difference $\Delta a_x$ in the X direction is always constant. The periods d of the diffraction grating of the diffraction element 17 may be specified such that the positional difference $\Delta a_x$ in the X direction is within a predetermined range.

Accordingly, the spectrometric measurement apparatus according to the present embodiment is capable of acquiring precise spectral properties within a short period of time, regardless of the image height.

The spectrometric measurement apparatus according to the present embodiment includes a 45/0 optical system. Specifically, as shown in FIG. 2, the light emitted from the line radiation light source 12 is radiated onto the surface of the image carrying medium 11 such as paper at an angle of 45°. Furthermore, the line sensor 18 is configured to receive light that is diffuse reflected in a perpendicular direction with respect to the image carrying medium 11.

However, the spectrometric measurement apparatus according to the present embodiment may include an optical system other than a 45/0 optical system. For example, the spectrometric measurement apparatus may include a 0/45 optical system. Specifically, the light emitted from the line radiation light source 12 may be radiated onto the surface of the image carrying medium 11 in a perpendicular manner. Furthermore, the line sensor 18 may detect a light that is diffuse reflected at an angle of 45° with respect to the image carrying medium 11.

Figure 12:
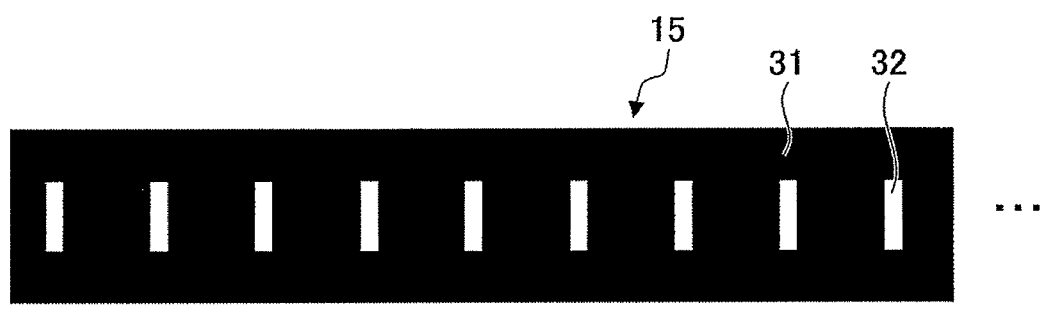
FIG. 12 illustrates a hole array used in the first embodiment of the present invention.

Next, a description is given of the hole array 15. FIG. 12 illustrates the hole array 15 used in the spectrometric measurement apparatus according to the present embodiment. The hole array 15 includes a light shielding part 31 with plural openings 32 for transmitting light. The openings 32 are rectangular slits that are arranged along a row at predetermined intervals. The shapes of the openings 32 are not limited to rectangles; the openings 32 may have other shapes such as ovals or circles.

A light beam that has passed through one of the openings 32 of the hole array 15 is dispersed by the diffraction element 17 as illustrated in FIG. 4, and the dispersed light beams enter the N pixels 21 of the line sensor 18. That is to say, each of the openings 32 of the hole array 15 corresponds to one of the spectrometric sensors 22 of the line sensor 18. Accordingly, a light beam transmitted through each of the openings 32 of the hole array 15 is dispersed, and the dispersed light beams enter the N pixels 21 of one of the spectrometric sensors 22 of the line sensor 18. Thus, in the N pixels 21 of the spectrometric sensor 22, the light amounts of the light beams for each wavelength band can be detected as electric signals.

The hole array 15 may be formed by providing openings 32 in a metal plate with a blackened surface, or by providing a chromium film or a film made of a black material such as carbon-containing resin at areas other than the openings 32 on the surface of a glass substrate.

Figure 13:
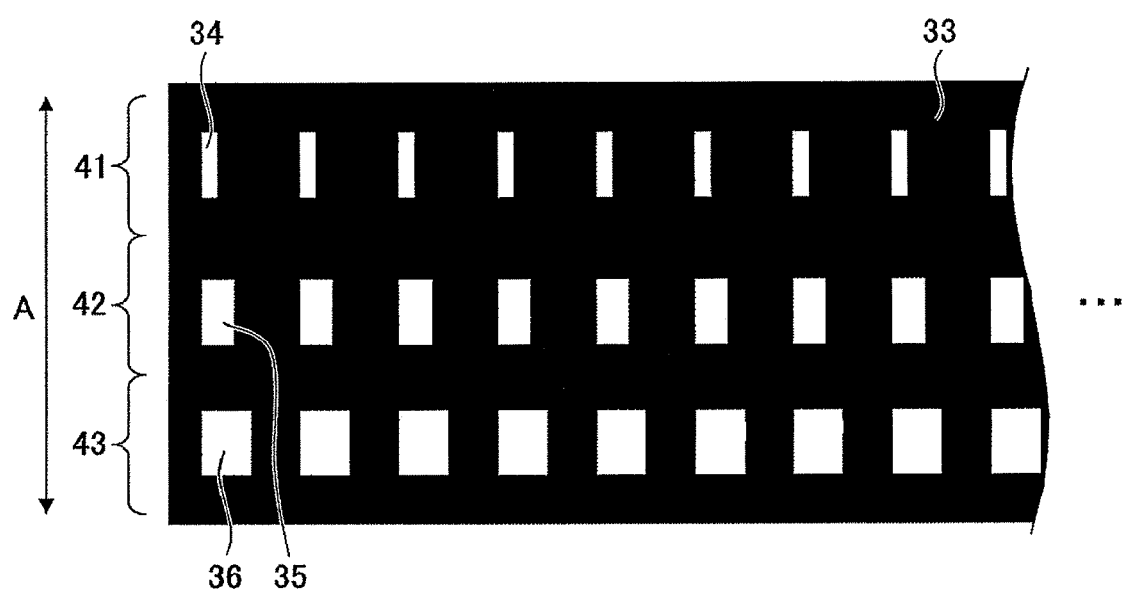
FIG. 13 illustrates another example of the hole array used in the first embodiment of the present invention.

FIG. 13 illustrates another example of the hole array. This hole array includes a first area 41 in which narrow openings 34 are arranged in a row, a second area 42 in which the second widest openings 35 are arranged in a row, and a third area 43 in which the widest openings 36 are arranged in a row. By moving this hole array in directions indicated by an arrow A, it is possible switch the area into which the light enters, among the first area 41, the second area 42, and the third area 43. By switching the area into which the light enters among the first area 41, the second area 42, and the third area 43, spectral properties can be acquired in accordance with the desired wavelength resolution.

Accordingly, the spectrometric measurement apparatus according to the present embodiment is capable of easily acquiring high-precision spectral properties regardless of the image height.

Incidentally, in the spectrometric measurement apparatus according to the present embodiment, the larger the number N of the pixels 21 included in the spectrometric sensor 22 of the line sensor 18, the more detailed the acquired spectral properties become. However, there is a limit to the number of pixels that can be included in the line sensor 18, and therefore as the number N of pixels 21 increase, the number of spectrometric sensors 22 in the line sensor 18 decreases.

Accordingly, particularly for the purpose of color measurement, the spectrometric measurement apparatus according to the present embodiment preferably includes a minimum number N of the pixels 21, and the spectrometric distribution is preferably estimated by an estimation method such as the Wiener estimation technique.

A description is given of an example of a method of estimating the spectrometric distribution based on the output from one of the spectrometric sensors 22. A row vector v and a row vector r are expressed by the following formula (3). The row vector v stores output signals vi (i=1 through N) from the N pixels 21 included in one of the spectrometric sensors 22. The row vector r stores the spectral reflectivity in each of the wavelength bands (for example, 31 items separated by a pitch of 10 nm at 400 nm through 700 nm) from a conversion matrix G.

$$r = Gv \quad (3)$$

The conversion matrix G can be obtained as follows for multiple samples (n samples) for which the spectrometric distribution is known in advance. The conversion matrix G is obtained based on a matrix R and a matrix V, by minimizing the square norm of error $\|\cdot\|2$ with the use of the least-squares method. The matrix R stores spectrometric distributions. The matrix V stores row vectors v that are obtained when the n samples are measured with the spectrometric measurement apparatus according to the present embodiment.

$$R = [r1, r2, \ldots, rn] \quad (4)$$

$$V = [v1, v2, \ldots, vn] \quad (5)$$

$$e = \|R - GV\|2 \rightarrow \min \quad (6)$$

The conversion matrix G is a regression coefficient matrix of a regression formula from V to R, where V is the explanatory variable and R is the objective variable. A Moore-Penrose generalized inverse matrix for providing a least-squares and minimum-norm solution of the matrix V is used to express such a conversion matrix G, which is expressed by the following formula (7).

$$G = RV^T (VV^T)^{-1} \quad (7)$$

The superscript T means transposition of the matrix, and the superscript −1 means the inverse matrix. The calculated conversion matrix G is stored. When the measurement is actually performed, the product of the conversion matrix G and the row vector r of the output signals is obtained. Based on the product, it is possible to estimate the row vector r of the spectrometric distribution of an arbitrary measurement target.

Figure 14:
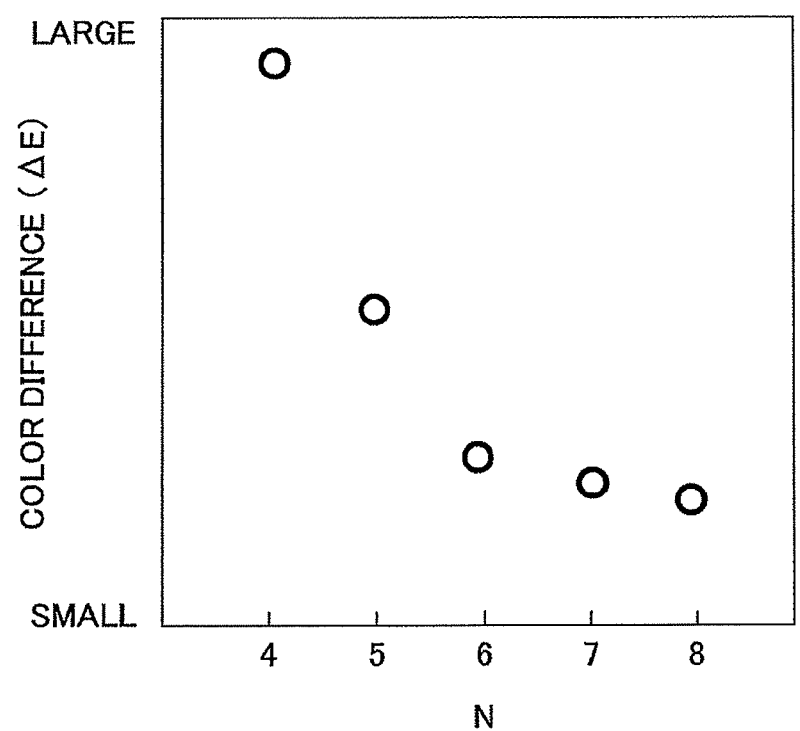
FIG. 14 is a correlation chart of the number N of pixels and a color difference in the spectrometric measurement apparatus according to the first embodiment of the present invention.

Furthermore, a description is given of results obtained when the spectrometric measurement apparatus according to the present embodiment is used to perform a simulation of the spectrometric distribution of a color image formed with toner output from an electrophotographic image forming apparatus. In the simulation process, a color difference ΔE is obtained, which is the difference between the color measurement result obtained with different numbers N of pixels 21 included in the spectrometric sensor 22, and the color measurement result obtained with the use of a spectrometric measurement apparatus having higher precision. FIG. 14 illustrates the results obtained by the simulation, indicating the relationship between the number N of the pixels 21 included in the spectrometric sensor 22 of the line sensor 18, and the color difference ΔE. As shown in FIG. 14, when the value of N is six or more, the color difference is relatively low, which means that the error in the spectrometric measurement apparatus according to the present embodiment is low with respect to a high-precision spectrometric measurement apparatus. As described above, in order to measure a color image formed with toner, the value of N is preferably six or more in the spectrometric measurement apparatus according to the present embodiment.

Second Embodiment

Next, a description is given of a second embodiment of the present invention. The present embodiment is relevant to the structure of the diffraction element 17 included in the spectrometric measurement apparatus according to the first embodiment of the present invention.

The diffraction element 17 is made of a material having a refraction index $n(\lambda)$ having sawtooth projections with a height of h. When the angle at which the primary light beam enters the diffraction element 17 is $\theta_{in}$, the diffraction efficiency η is expressed by the following formula 8.

$$\eta = \left[ \mathrm{sinc}\left\{\pi\left(1 - \frac{h}{\lambda}\left(\sqrt{n(\lambda)^2 - \sin^2\theta_{in}} - \cos\theta_{in}\right)\right)\right\}\right]^2 \quad \text{(Formula 8)}$$

As indicated by formula 8, the diffraction efficiency η of light entering the diffraction element 17 has wavelength dependency, and is also dependent on the incidence angle $\theta_{in}$. As described above, the incidence angle $\theta_{in}$ of the primary light beam entering the diffraction element 17 varies according to the image height of the image focused by the imaging optical system 16. Based on this image height, variations are caused in the diffraction efficiency η, and differences are caused in the spectral properties of light beams entering the line sensor 18.

Therefore, the diffraction element 17 according to the present embodiment is configured such that the diffraction efficiency η is substantially a constant value. Specifically, the height h of the diffraction grating of the diffraction element 17 is adjusted in accordance with the incidence angle $\theta_{in}$ of the primary light beam, i.e., in accordance with the image height of the image focused by the imaging optical system 16.

Figure 15:
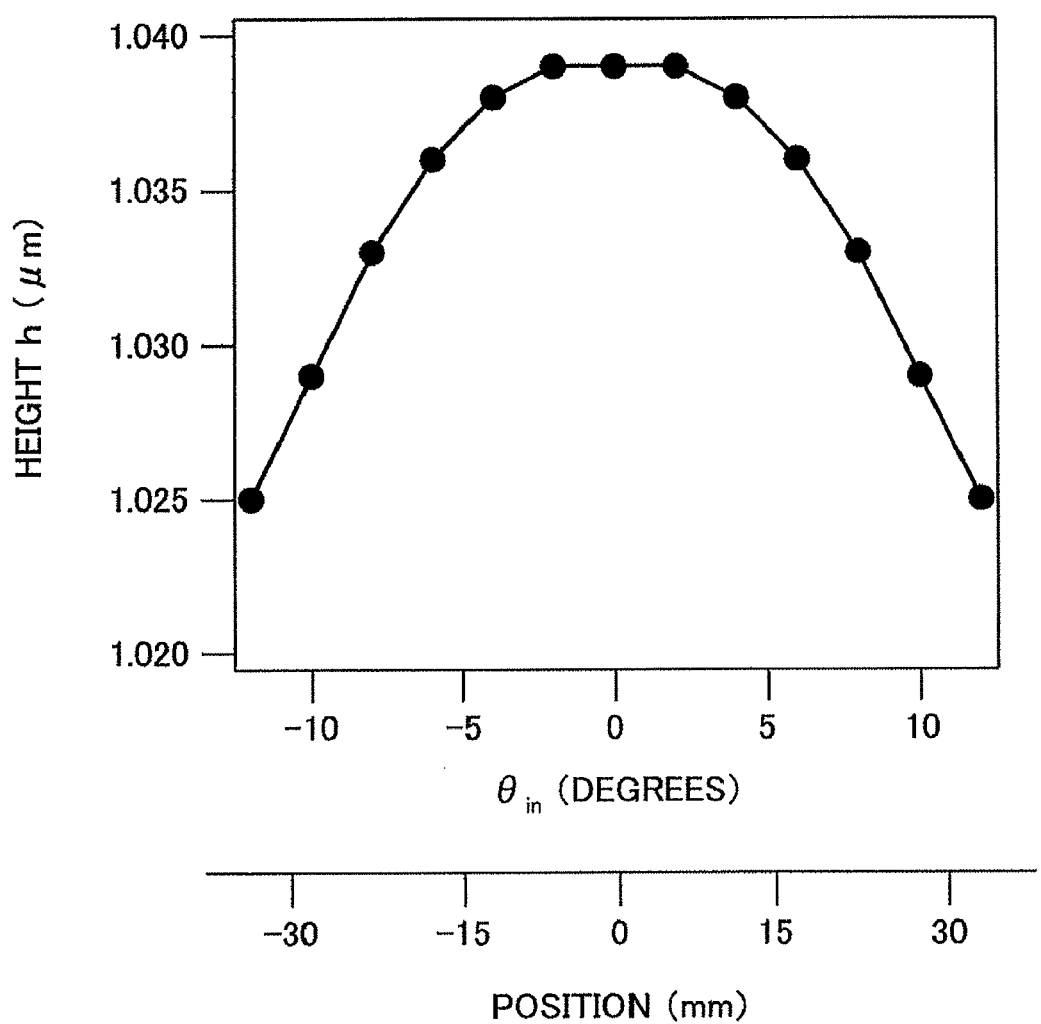
FIG. 15 indicates a height h in a diffraction element used in a spectrometric measurement apparatus according to a second embodiment of the present invention.

Specifically, the height h of the diffraction grating of the diffraction element 17 is adjusted in accordance with the incidence angle $\theta_{in}$ of the primary light beam as shown in FIG. 15. In FIG. 15, positions in the diffraction element 17 are indicated along a bottom row below the horizontal axis. Specifically, when a lens for a line sensor is used as described above, the angle $\theta_{in}$ of ±10° corresponds to an image height of ±30 mm. In the case shown in FIG. 15, the height h of the diffraction grating of the diffraction element 17 is adjusted such that the diffraction efficiency η becomes optimum with respect to a light beam having a wavelength of 0.53 μm. Furthermore, in the diffraction element 17 according to the present embodiment, the height at the center portion is higher than other parts of the diffraction element 17. The diffraction efficiency r obtained by formula 8 is an approximate value. Therefore, the height h is preferably defined by performing analysis with the use of a more rigorous analysis method such as Rigorous Coupled Wave Analysis (RCWA). The height h of the diffraction grating is not limited to vary continuously; the height h may vary in a stepwise manner.

In the spectrometric measurement apparatus according to the present embodiment, the height h of the diffraction grating in the diffraction element 17 varies in accordance with the image height of the image focused by the imaging optical system 16. Therefore, diffraction light beams having substantially the same diffraction efficiency enter the respective spectrometric sensors 22 of the line sensor 18. Accordingly, it is possible to acquire high-precision spectral properties, regardless of the image height of the image focused by the imaging optical system 16.

Third Embodiment

Next, a description is given of a third embodiment of the present invention. A spectrometric measurement apparatus according to the present embodiment is configured to prevent zero order light, etc., diffracted at the diffraction element 17, from entering the pixels 21 of the line sensor 18. Accordingly, the spectrometric measurement apparatus according to the present embodiment can acquire spectral properties of even higher precision.

In the spectrometric measurement apparatus according to the present embodiment, the diffraction grating vector direction of the diffraction element 17 indicated by the arrow B in FIG. 4 and the direction in which the pixels 21 are arranged in the line sensor 18 are nonparallel (not parallel). By arranging these directions in a nonparallel manner, it is possible to prevent zero order light or diffraction light other than +first-order diffraction light diffracted at the diffraction element 17 from entering the pixels 21 of the line sensor 18. In the line sensor 18, the pixels 21 are arranged in a one-dimensional direction.

Figure 16:
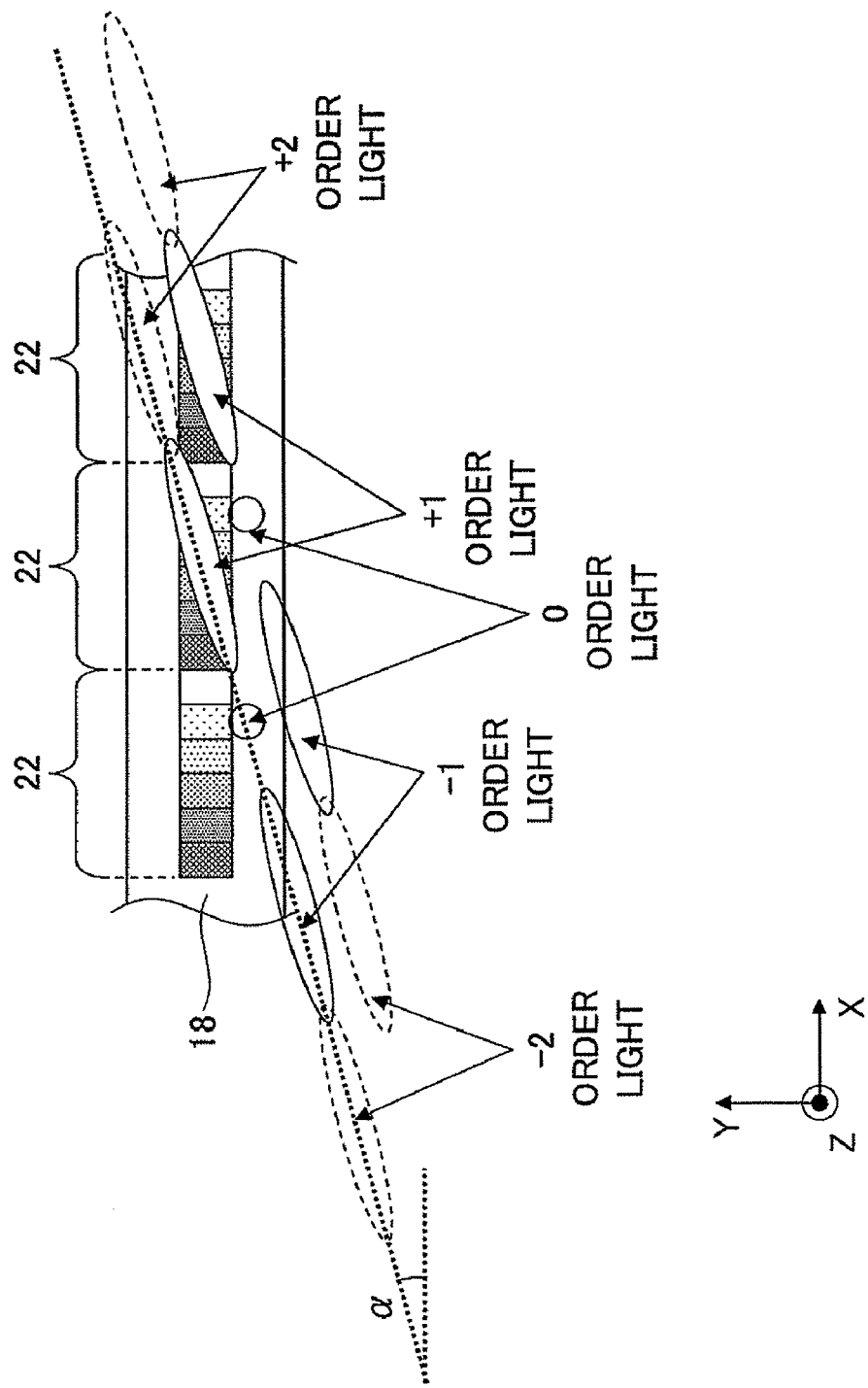
FIG. 16 is for describing a spectrometric measurement apparatus according to a third embodiment of the present invention.

A description is given of the spectrometric measurement apparatus according to the third embodiment of the present invention with reference to FIG. 16. FIG. 16 illustrates light beams entering the line sensor 18, as viewed from the incidence surface onto which the light enters the line sensor 18. As shown in FIG. 16, the light diffracted at the diffraction element 17 include +first-order diffraction light (+first-order light), zero order light, −first-order diffraction light (−first-order light), +second-order diffraction light (+second-order light), and −second-order diffraction light (−second-order light). Although the zero order light, the −first-order diffraction light, the +second-order diffraction light, and the −second-order diffraction light have lower intensities than that of the +first-order diffraction light, they degrade the precision of the spectral properties when they enter the pixels 21 of the line sensor 18.

In the present embodiment, the diffraction grating vector direction of the diffraction element 17 and the direction in which the pixels 21 are arranged in the line sensor 18 are tilted with respect to each other at an angle α. That is to say, on the X-Z plane corresponding to the surface of the sheet on which FIG. 1 is depicted, the diffraction grating vector direction of the diffraction element 17 is tilted with respect to the X axis by an angle α. The pixels 21 of the line sensor 18 are arranged along the X axis.

By arranging the line sensor 18 and the diffraction element 17 in the above manner, it is possible to allow only the +first-order diffraction light dispersed by the diffraction element 17 to enter the pixels 21 arranged in the line sensor 18. That is, the zero order light, the −first-order diffraction light, the +second-order diffraction light, and the −second-order diffraction light are prevented from entering the pixels 21 arranged in the line sensor 18.

A light shielding plate may be provided between the line sensor 18 and the diffraction element 17. This light shielding plate may have openings such that only the +first-order diffraction light enters the pixels 21 arranged in the line sensor 18.

Fourth Embodiment

Next, a description is given of a fourth embodiment of the present invention. The spectrometric measurement apparatus according to the fourth embodiment is a modified version of that of the third embodiment.

Incidentally, when the diffraction grating vector direction of the diffraction element 17 is tilted with respect to the X axis by an angle α on the X-Z plane, the following situation may arise. That is, the incidence angle $\theta_{in}$ of the light entering the diffraction element 17 varies in accordance with the image height of the image focused by the imaging optical system 16. Therefore, the position of the light entering the line sensor 18 may shift in the Y direction.

Figure 17:
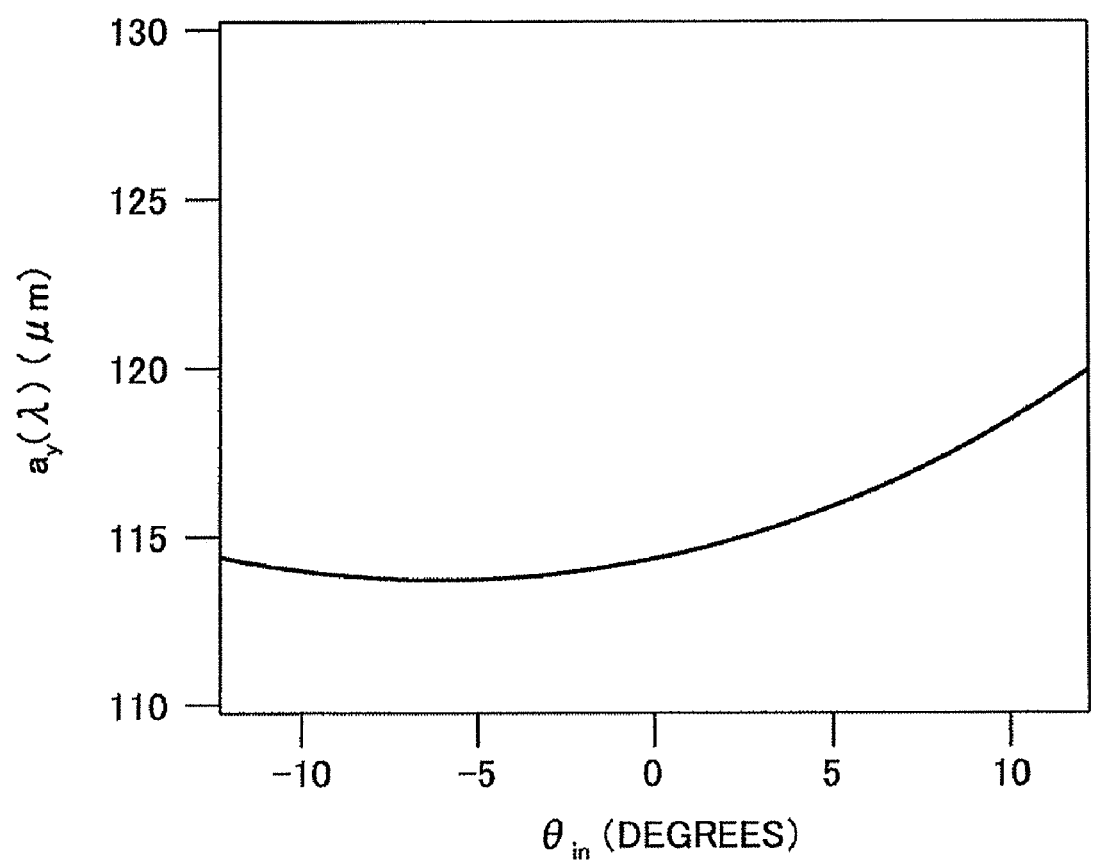
FIG. 17 is a correlation chart of an incidence angle $\theta_{in}$ of a light beam entering a diffraction grating and a position $a_y$.

FIG. 17 indicates the relationship between the incidence angle $\theta_{in}$ and the incidence position $a_y(\lambda)$ along the Y direction of light under the following conditions. Specifically, the conditions are that α is 50°, the length t is 0.927 mm, the period d of the diffraction grating of the diffraction element 17 is approximately 3.333 μm, and the +first-order diffraction light having a wavelength of 530 nm enters the line sensor 18.

If the position of the +first-order diffraction light shifts in the Y direction, the +first-order diffraction light does not precisely enter the pixels 21 of the line sensor 18. Furthermore, ±second-order diffraction light may enter the pixels 21 of the line sensor 18. Thus, it would be difficult to acquire high-precision spectral properties.

Figure 18:
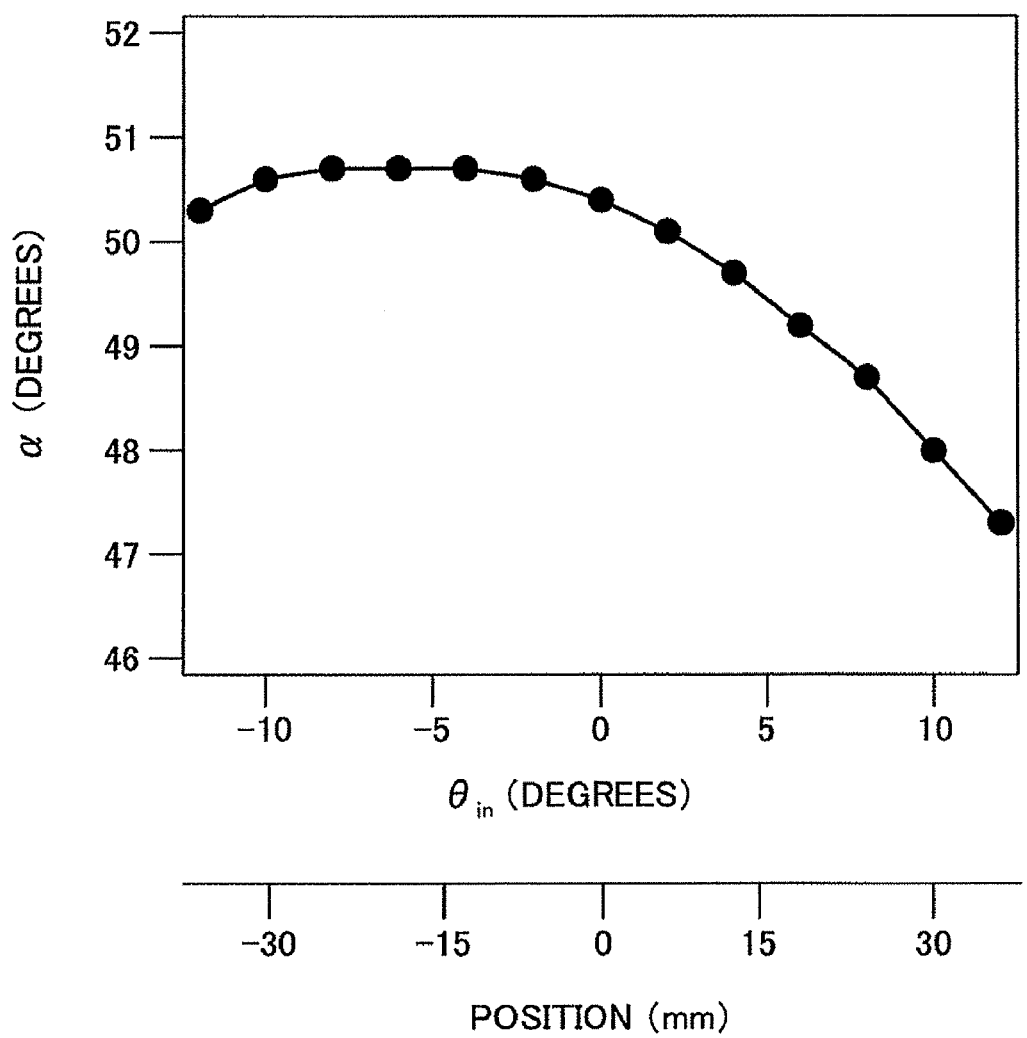
FIG. 18 indicates an angle α of a diffraction element used in a spectrometric measurement apparatus according to a fourth embodiment of the present invention.

Accordingly, in the spectrometric measurement apparatus according to the present embodiment, the diffraction grating vector in the diffraction element 17, i.e., the angle α is varied in accordance with the image height. Specifically, as shown in FIG. 18, the angle α of the diffraction element 17 is varied in accordance with the incidence angle $\theta_{in}$ of the light. In FIG. 18, positions in the diffraction element 17 are indicated along a bottom row below the horizontal axis. Specifically, when a lens for a line sensor is used as described above, the angle $\theta_n$ of ±10° corresponds to an image height of ±30 mm.

Figure 19:
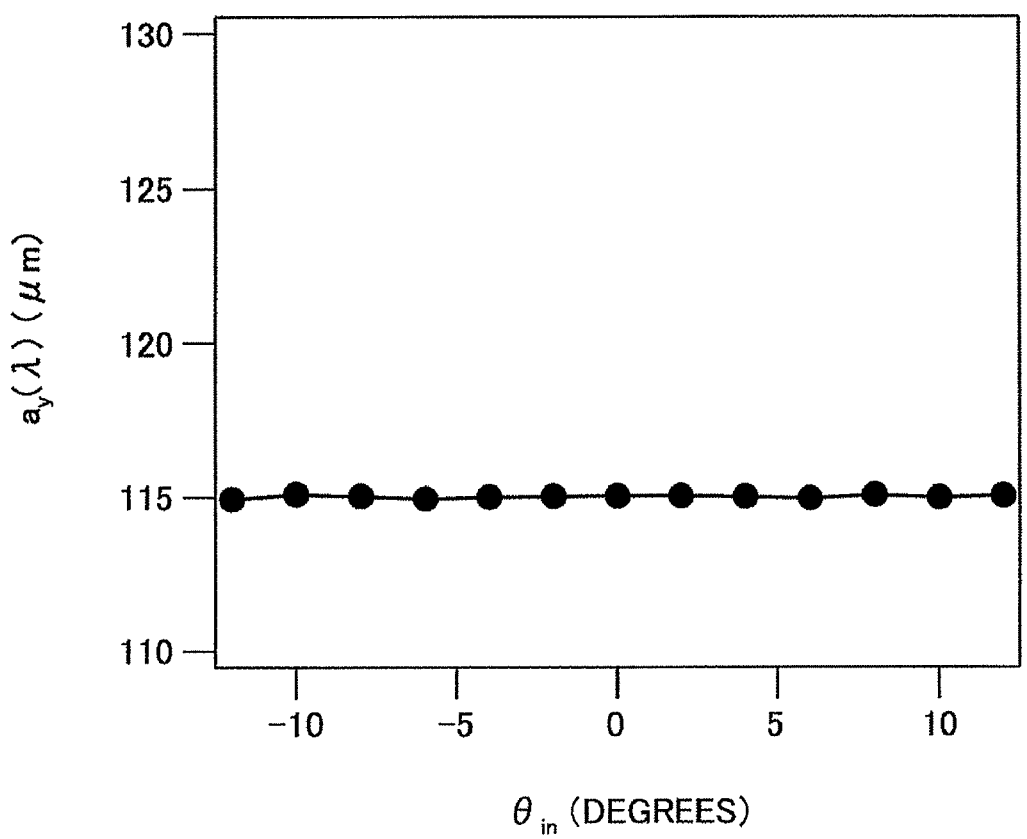
FIG. 19 is a correlation chart of an incidence angle $\theta_{in}$ and a position $a_y$ of a light beam entering the diffraction grating described with reference to FIG. 18.

FIG. 19 indicates the relationship between the incidence angle $\theta_{in}$ and the incidence position $a_y(\lambda)$ along the Y direction of light having a wavelength of 530 nm. By using the diffraction element 17 described with reference to FIG. 18, it is possible to make the incidence position $a_y(\lambda)$ of light in the Y direction substantially constant, regardless of the angle $\theta_{in}$, as shown in FIG. 19. As described above, by varying the diffraction grating vector direction in the diffraction element 17 in accordance with the image height of the image focused by the imaging optical system 16, it is possible to make the incidence position $a_y(\lambda)$ of light in the Y direction substantially constant, regardless of the image height of the image focused by the imaging optical system 16.

Accordingly, the spectrometric measurement apparatus according to the present embodiment is capable of making the incidence position $a_y(\lambda)$ of light in the Y direction substantially constant, regardless of the image height of the image focused by the imaging optical system 16, and measuring high-precision spectral properties.

In the diffraction element 17 according to the present embodiment, in addition to varying the direction of the diffraction grating vector, the height h of the diffraction grating (see FIG. 10) may also be varied. By optimizing the period d, the height h, and the angle α in accordance with the image height, it is possible to acquire spectral properties of even higher precision.

Fifth Embodiment

Next, a description is given of a fifth embodiment of the present invention. An image evaluation apparatus according to the fifth embodiment of the present invention uses the spectrometric measurement apparatus according to any one of the first through fourth embodiments.

Figure 20:
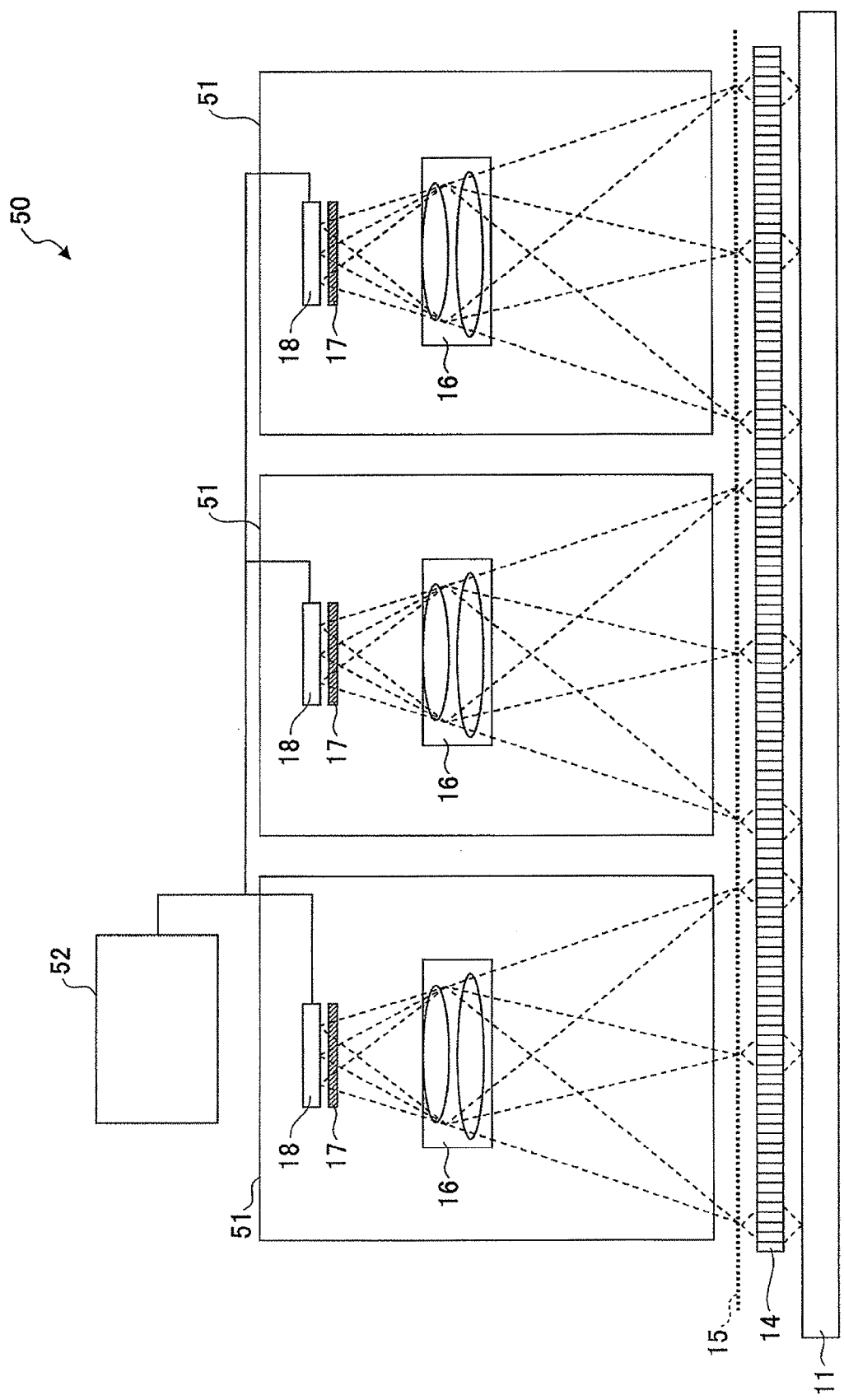
FIG. 20 illustrates an image evaluation apparatus according to a fifth embodiment of the present invention.

A description is given of an image evaluation apparatus 50 according to the present embodiment, with reference to FIG. 20. The image evaluation apparatus 50 according to the present embodiment can evaluate an image formed on the image carrying medium 11 such as paper by an image forming apparatus, etc., across the full width of the paper sheet. The image evaluation apparatus 50 according to the present embodiment includes plural spectrometric measurement apparatuses illustrated in FIG. 1. Specifically, plural measurement units 51 are provided, each including the imaging optical system 16, the diffraction element 17, and the line sensor 18. The measurement units 51 are connected to a processing unit 52. With such a configuration, it is possible to measure spectral properties across a wide range on the image carrying medium 11 such as paper. The image evaluation apparatus 50 according to the present embodiment includes a paper conveying mechanism (not shown), which conveys the image carrying medium 11 such as paper in the depth direction with respect to the surface of the sheet on which FIG. 20 is depicted. The processing unit 52 calculates the spectral properties of an image on the entire image carrying medium 11 such as paper. The calculation is performed based on the measurement results obtained by the plural measurement units 51 and speed information obtained by an encoder sensor that is provided in the paper conveying mechanism (not shown). Furthermore, the processing unit 52 has a function of evaluating the image formed on the image carrying medium 11 such as paper, based on the spectral properties.

Sixth Embodiment

Next, a description is given of a sixth embodiment of the present invention. An image forming apparatus according to the sixth embodiment of the present invention includes the image evaluation apparatus 50 according to the fifth embodiment.

Figure 21:
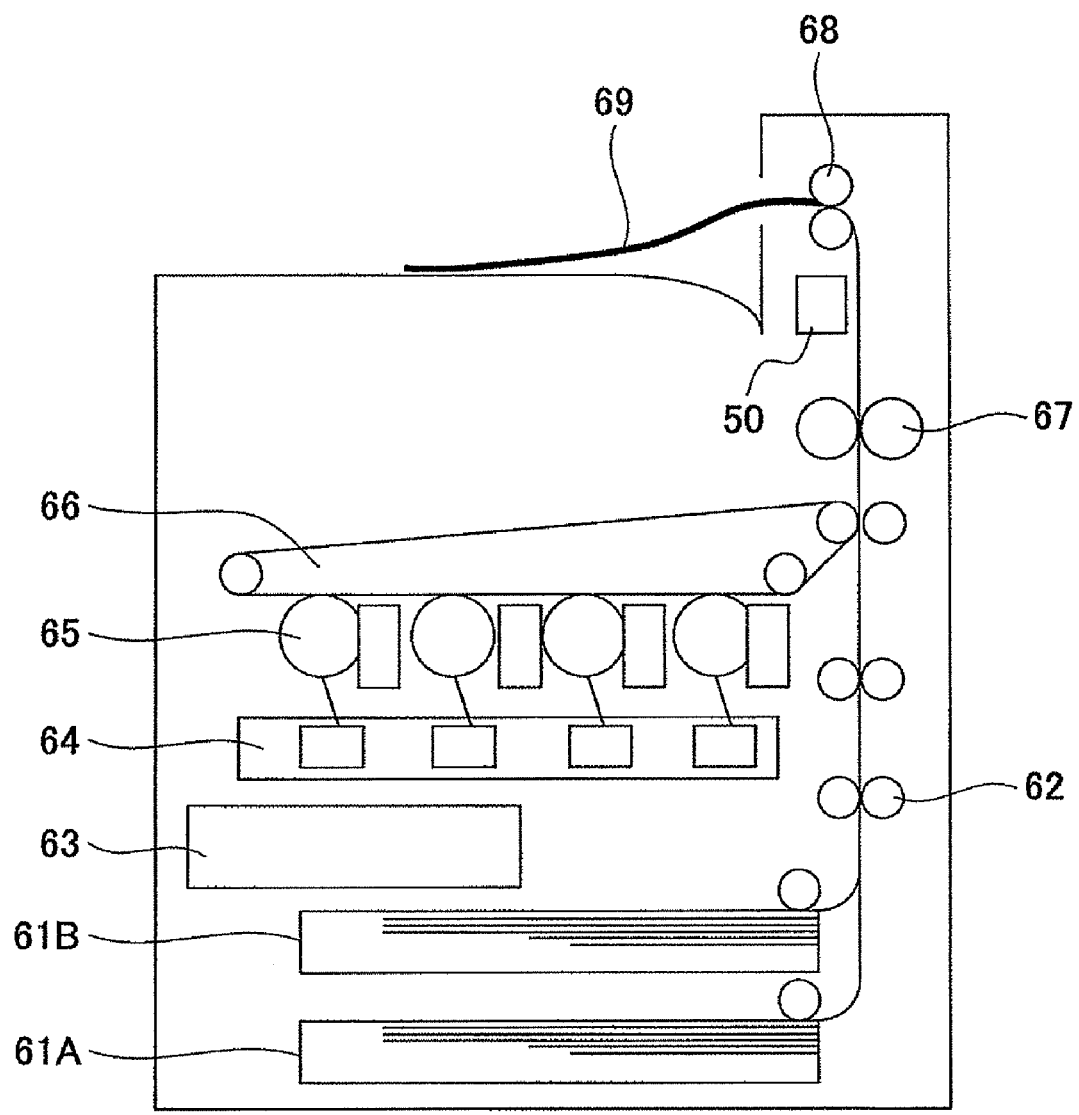
FIG. 21 illustrates an image forming apparatus according to a sixth embodiment of the present invention.

A description is given of an image forming apparatus according to the present embodiment, with reference to FIG. 21. The image forming apparatus according to the present embodiment includes sheet feeding trays 61A and 61B, sheet feeding rollers 62, a controller 63, a scanning optical system 64, photoconductor units 65, an intermediate transfer body 66, a fixing unit 67, and sheet discharge rollers 68. The image evaluation apparatus 50 according to the fifth embodiment is provided between the fixing unit 67 and the sheet discharge rollers 68. In the image forming apparatus according to the present embodiment, an image forming unit is constituted by members other than the image evaluation apparatus 50.

In the image forming apparatus according to the present embodiment, a paper sheet 69 which is an image carrying medium is conveyed by the sheet feeding rollers 62 from either one of the sheet feeding trays 61A and 61B. Meanwhile, photoconductors included in the photoconductor units 65 are exposed by the scanning optical system 64, color material is applied to the photoconductors, and images are developed. The images developed with the color material are transferred to the intermediate transfer body 66, and are then transferred from the intermediate transfer body 66 to the paper sheet 69. The images that have been transferred onto the paper sheet 69 are fixed by the fixing unit 67. The paper sheet 69 on which the image has been formed is ejected by the sheet discharge rollers 68.

In the image forming apparatus according to the present embodiment, the image evaluation apparatus 50 evaluates the image fixed on the paper sheet 69 based on spectrometric measurement. The image evaluation apparatus 50 transfers the image evaluation results to the controller 63. Thus, the image forming apparatus according to the present embodiment can form optimum images based on image evaluations.

Accordingly, the image forming apparatus according to the present embodiment can provide high-quality images without color fluctuations across the entire image. Furthermore, automatic calibration can be performed on the colors, and therefore images can be stably formed on image carrying media such as paper. Moreover, image information can be acquired from the entire image, and therefore it is possible to examine the image and save the print data. Thus, image formation can be performed in a highly reliable manner.

In the present embodiment, a description is given of an electrophotographic image forming apparatus in which toner is used. However, the present invention is also applicable to other types of electrophotographic image forming apparatuses, an inkjet type image forming apparatus, offline printing, and color proofing.

The present invention is not limited to the specific embodiments described herein, and variations and modifications may be made without departing from the scope of the present invention.

The present application is based on Japanese Priority Patent Application No. 2009-253498, filed on Nov. 4, 2009, the entire contents of which are hereby incorporated herein by reference.

What is claimed is:

1. A spectrometric measurement apparatus comprising:
   a light radiation unit configured to radiate light onto an image carrying medium;
   a hole array including plural openings that are arranged in a one-dimensional manner for transmitting a part of the light corresponding to diffusion light from the image carrying medium;
   an imaging optical system configured to focus an image from the hole array;
   a diffraction element configured to diffract the light for focusing the image; and
   a light receiving unit including plural pixels arranged in a one-dimensional manner configured to receive the light that has been dispersed by the diffraction element, the light receiving unit further including plural spectrometric sensors each corresponding to a predetermined number of the plural pixels, wherein
   the light transmitted through each of the plural openings of the hole array is dispersed by the diffraction element, and then the light enters the plural pixels corresponding to one of the plural spectrometric sensors of the light receiving unit so that spectral properties of the diffusion light are acquired, and
   a structure of the diffraction element includes variations that are formed in accordance with an image height of the image that is focused by the imaging optical system.

2. The spectrometric measurement apparatus according to claim 1, wherein
   the diffraction element includes any one of
      a periodic structure having sawtooth-shapes or step-like shapes formed on a surface of the diffraction element,
      a periodic structure having the sawtooth-shapes or the step-like shapes formed in an interface between two members having different refraction indices that are adhered together, and
      a periodic structure in which a refraction index varies, wherein
   the diffraction element is formed such that a period of the periodic structure varies in accordance with the image height of the image that is focused by the image optical system, such that the light transmitted through each of the plural openings of the hole array enters the predetermined number of the plural pixels corresponding to one of the plural spectrometric sensors.

3. The spectrometric measurement apparatus according to claim 1, wherein
   the diffraction element includes one of
      a periodic structure having sawtooth-shapes or step-like shapes formed on a surface of the diffraction element, and
      a periodic structure having the sawtooth-shapes or the step-like shapes formed in an interface between two members having different refraction indices that are adhered together, wherein the diffraction element is formed such that a height of the sawtooth-shapes or the step-like shapes varies in accordance with the image height of the image that is focused by the image optical system, such that the light transmitted through each of the plural openings of the hole array enters the predetermined number of the plural pixels corresponding to one of the plural spectrometric sensors.

4. The spectrometric measurement apparatus according to claim 1, wherein
the structure of the diffraction element includes a diffraction grating, and
a direction in which the diffraction grating is arranged in the diffraction element and a direction in which the plural pixels are arranged in the light receiving unit are nonparallel.

5. The spectrometric measurement apparatus according to claim 4, wherein
the diffraction element is formed such that the direction in which the diffraction grating is arranged in the diffraction element varies in accordance with the image height of the image that is focused by the image optical system, such that the light transmitted through each of the plural openings of the hole array enters one or more of the plural pixels corresponding to one of the plural spectrometric sensors.

6. The spectrometric measurement apparatus according to claim 1, wherein
the light that enters the plural spectrometric sensors of the light receiving unit is a +first-order diffraction light that is diffracted by the diffraction element.

7. The spectrometric measurement apparatus according to claim 1, wherein
the predetermined number of the plural pixels is six.

8. An image evaluation apparatus for evaluating colors of a color image including plural colors formed on an image carrying medium, the image evaluation apparatus comprising:
a spectrometric measurement apparatus including
a light radiation unit configured to radiate light onto the image carrying medium,
a hole array including plural openings that are arranged in a one-dimensional manner for transmitting a part of the light corresponding to diffusion light from the image carrying medium,
an imaging optical system configured to focus an image from the hole array,
a diffraction element configured to diffract the light for focusing the image, and
a light receiving unit including plural pixels arranged in a one-dimensional manner configured to receive the light that has been dispersed by the diffraction element, the light receiving unit further including plural spectrometric sensors each corresponding to a predetermined number of the plural pixels, wherein
the light transmitted through each of the plural openings of the hole array is dispersed by the diffraction element, and then the light enters the plural pixels corresponding to one of the plural spectrometric sensors of the light receiving unit so that spectral properties of the diffusion light are acquired, and
a structure of the diffraction element includes variations that are formed in accordance with an image height of the image that is focused by the imaging optical system; and
a processing unit configured to evaluate the color image based on the spectral properties acquired by the spectrometric measurement apparatus.

9. An image forming apparatus comprising:
the image evaluation apparatus according to claim 8; and
an image forming unit configured to form the color image on the image carrying medium.

* * * * *